(No Model.)

J. T. UPINGTON.
WHEEL.

No. 381,445. Patented Apr. 17, 1888.

Attest.
F. L. Merriam.
C. C. Merriam.

Inventor.
James T. Upington,
per Wm. Hubbell Fisher,
Atty.

UNITED STATES PATENT OFFICE.

JAMES T. UPINGTON, OF LEXINGTON, KENTUCKY.

WHEEL.

SPECIFICATION forming part of Letters Patent No. 381,445, dated April 17, 1888.

Application filed September 19, 1887. Serial No. 250,122. (No model.)

*To all whom it may concern:*

Be it known that I, JAMES T. UPINGTON, a resident of Lexington, Fayette county, Kentucky, have invented certain new and useful Improvements in Wheels, of which the following is a specification.

The several features of my invention and the advantages arising from their use, conjointly or otherwise, will be apparent from the following description.

Figure 1:
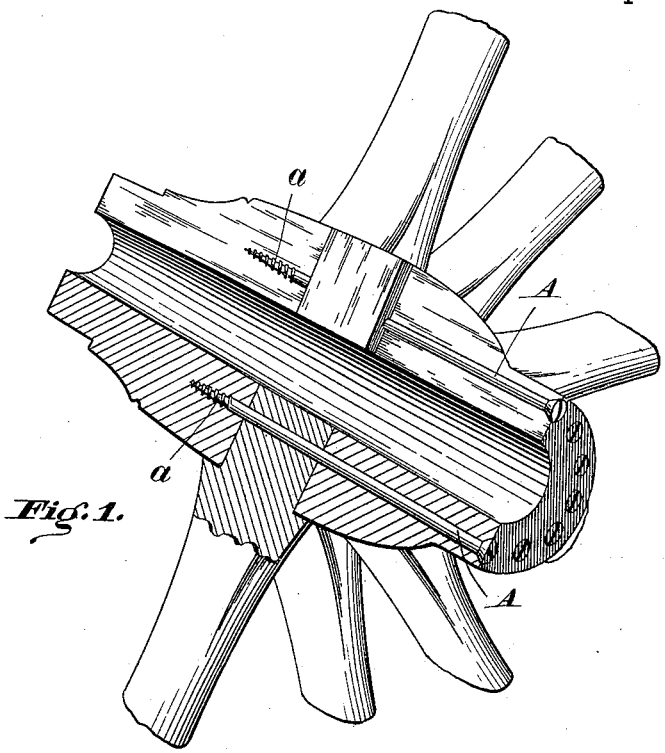
Figure 2:
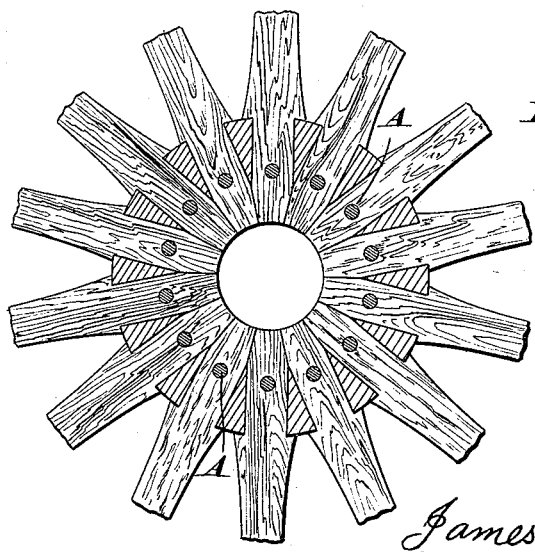

In the accompanying drawings, forming part of this specification, Figure 1 is a perspective view, partly sectioned, illustrating a wheel embodying my improvements. Fig. 2 is a cross-section through the center of the hub, showing the spokes broken off.

The wheel is made in any desired manner, and with the ends of the spokes either straight or dovetailed.

I preferably apply my invention to wheels made with a solid hub, into which spokes with straight ends are driven. After the wheel is completed in the ordinary way I bore a series of holes into the hub. Each of these holes runs practically parallel to the long axis of the hub, and each passes through the end of a spoke within the hub and beyond the spoke. The number of holes corresponds to the number of spokes. Into each of these holes I now insert a pin or screw, A, which fills the entire hole, and passing through the end of the spoke holds the same firmly in position. While a simple pin, either of wood or metal and without screw-thread, may be used for the purpose, I preferably employ a long narrow screw, and this screw is preferably threaded only a short distance at the end, as shown in the drawings at *a*. The screw may, however, be threaded throughout its whole length. The hub is not weakened at all by the holes drilled in it, because they are entirely filled by the pins or screws. Indeed, the wheel is stronger than if the hub had been left intact, besides possessing the important advantage of having the spokes firmly held in their sockets. The screw has the advantage over the simple pin of being removable—a feature of importance when the wheel is to be repaired.

What I claim as new, and desire to secure by Letters Patent, is—

1. The combination of a hub, spoke, and screw or pin, A, extending lengthwise of the hub, transfixing the spoke, and having a screw-threaded portion engaged in the hub beyond the spoke, substantially as and for the purposes specified.

2. The combination of a hub, spoke, and pin extending longitudinally from the end of the hub through the spoke and partially through the hub beyond the spoke, substantially as and for the purposes specified.

JAS. T. UPINGTON.

In presence of—
JOHN CASY,
W. G. WARREN.